June 13, 1961

J. D. ROBINSON, JR 2,987,893

UNDERWATER CRAFT

Filed Oct. 29, 1956

*INVENTOR.*
JACK D. ROBINSON JR.

BY

ATTORNEY.

United States Patent Office 2,987,893
Patented June 13, 1961

2,987,893
UNDERWATER CRAFT
Jack D. Robinson, Jr., Norwalk, Conn., assignor to American Machine & Foundry Company, a corporation of New Jersey
Filed Oct. 29, 1956, Ser. No. 619,053
7 Claims. (Cl. 61—69)

This invention relates to mobile underwater craft and is more particularly concerned with underwater manipulating and televiewing apparatus which may be remotely operated and controlled by electrical impulses transmitted through a cable connecting the underwater craft with a remote control station.

Underwater craft when remotely controlled by way of a cable, whether towed or propelled, have hitherto suffered from insufficient stability in maintaining constant depth and in establishing and maintaining a desired course. These craft also were objectionably limited in speed and maneuverability due to excessive drag caused by unwieldy construction. They were unable to perform even simple work such as picking up objects and manipulating articles under water.

Furthermore, failure to establish coincidence in one plane, of the centers of drag, thrust and cable tension, and of providing a stablizing buoyancy-gravity coupled about this plane, caused control of the movements of these underwater craft to be cumbersome and unstable.

It is accordingly an object of the present invention to overcome the above mentioned difficulties by providing a remotely controlled underwater vehicle which by virtue of the bodily shape thereof, and the method of propulsion and control, permits accurate movements or hovering within the area of underwater operation.

Another object of the invention is to provide in a remotely controlled underwater vehicle, means for maintaining constant depth, and means for establishing and maintaining a desired course or heading.

An additional object of the invention is to provide a remotely controlled underwater vehicle which is inherently stable by virtue of having established in the design thereof coincidence in one plane of the centers of drag, thrust and cable tension, and of a stabilizing buoyancy-gravity coupled about this plane.

A further object of the invention is to provide a remotely controlled underwater craft having a propulsion unit, the angle of thrust with the horizontal plane is adjustable so as to provide components of thrust to overcome drag, buoyancy and cable tension.

A still further object of the invention is to provide a remotely controlled underwater vehicle including spherical pressure vessels which serve not only as enclosures for television apparatus, manipulating arm mechanism, instruments and circuit elements etc., but also serve as efficient buoyancy elements.

It is another object of the invention to provide a remotely controlled underwater craft having two fuselages comprising free flooding fairing of aircraft type construction, enclosing spherical pressure vessels, a manipulating arm mounted at the front end of one of the fuselages and a viewing camera mounted in the front end of the other fuselage.

Still another object of the invention is to provide means for improving the stability of remotely controlled underwater craft by reducing overturning forces, acting on the underwater television and manipulating vehicle, caused by tension exerted through a control cable.

A further object of the invention is to provide a remotely controlled underwater television system and manipulating mechanism which will be protected against water seepage particularly at great depths. Still another object of the invention is to provide an underwater viewing and manipulating apparatus which can be accurately and easily operated and controlled from a remote station.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
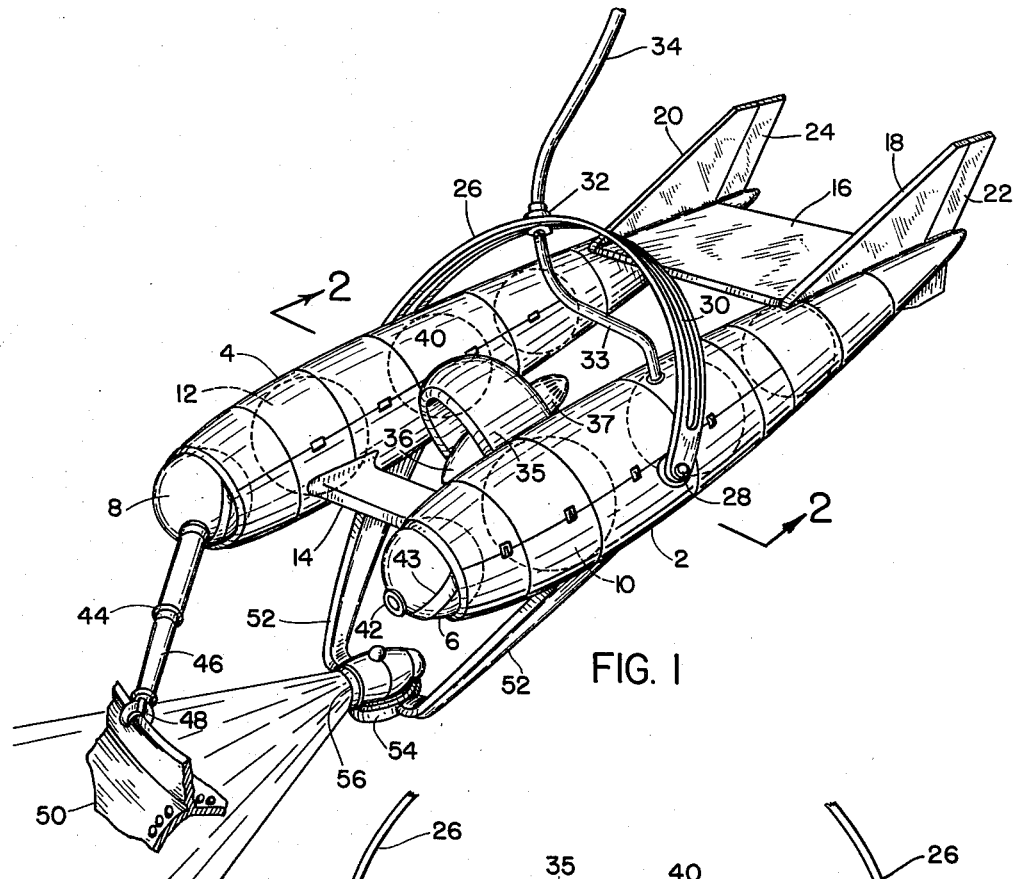
FIG. 1 shows a perspective view of a remotely controlled underwater craft equipped with the inventive improvements herein disclosed.
Figure 2:
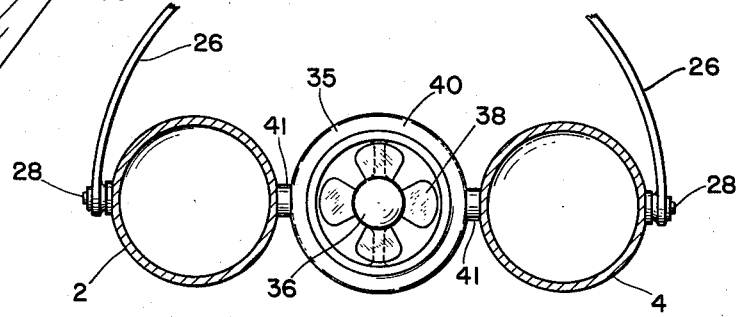
FIG. 2 is a transverse section through the central portion of the craft and is taken on line 2—2 of FIG. 1.

The craft comprises two spaced and elongated cigar-shaped fuselages or fairings 2 and 4 of aircraft type construction enclosing a plurality of spherical pressure vessels such as 6, 8, 10, and 12. The fairing is of a free flooding type permitting free access of the surrounding water into the interior of the fuselages thereby avoiding stresses on the fuselage due to ambient water pressure.

The fuselages 2 and 4 are joined together by planning surfaces 14 and 16. Stabilizing fins 18 and 20 and twin rudders 22 and 24 are provided on the rear ends of fuselages 2 and 4 respectively for control of heading and course of the craft.

An arched yoke 26 spans both fuselages 2 and 4, and is pivotally supported on both sides of the craft by means of pivots 28. The yoke 26 is provided with a suitable track such as slot 30 wherein a carriage 32 is mounted for free movement along said yoke 26. A control cable 34 is fixedly supported on the carriage 32, one end portion 33 of said cable extending into the fuselage 2.

Sufficient slack is provided in the portion 33 of the cable 34 to permit the carriage 32 and cable 33 to swing freely from one side of the underwater craft to the other while riding in slot 30 on the arched yoke 26. Pivots 28 are placed symmetrically about the centre of resistance of the craft and are located so that the centre of rotation of said pivots passes through said centre of resistance.

The propulsion force for the craft is provided by a single propulsion unit 35 comprising a free flooding motor 36, a gear box 37 and variable pitch screw 38, which is protectively surrounded by a guard ring 40. The entire propulsion unit with guard 40 is pivotally mounted on pivots 41 in between the fuselages 2 and 4.

Suitable actuating means are provided within the fuselages to tilt the propulsion unit 35 so that it can propel the underwater craft upwardly or downwardly depending on the direction in which said propulsion unit is tilted relative to the fuselages. In this manner components of thrust can be provided by the propulsion unit 35 to overcome any combination of drag, buoyancy and cable tension. Stability of the craft is accomplished by establishing coincidence in a single plane of the centers of thrust, drag, and cable tension, and of providing buoyancy-gravity forces coupled about this plane.

A plurality of spherical buoyancy tanks or pressure vessels 6, 8, 10, and 12, as mentioned herein earlier, are mounted inside the fuselages for supplying a slight buoyancy to the underwater craft. These vessels not only serve as efficient buoyancy elements but also as enclosures for television apparatus, instruments, circuit elements and mechanisms for operating the craft.

A television camera 42 is mounted in pressure vessel 6 in the nose of fuselage 2. Suitable mechanism as shown in FIG. 4 is provided for adjustment of television camera attitude in azimuth and elevation. A manipulating arm 44 is mounted on and extends forward from pressure vessel 8 located in the front end or nose of fuselage 4. Suitable mechanism is provided within pressure sphere 8 and in association therewith to swing this arm in any direction, up, down, or sideways. Manipulating arm 44 is of a telescoping type having an extension 46 and a claw 48 for performing simple work such as welding and cutting, handling lines, making and breaking simple fastenings, and taking bottom samples or retrieving objects such as object 50. Suitable mechanism for actuating arm 44 similar in nature to that disclosed in U.S. Patent No. 228,556 issued to C. F. Pike is preferably provided within vessel 8. These devices are well known in the art.

An auxiliary boom 52 suspended from fuselages 2 and 4 carries a platform 54 with floodlight 56 suitably mounted thereon. Suitable mechanism well known in the art may be provided to raise or lower the boom 52 to illuminate the area in front of the television camera. Also floodlight 56 is pivotally mounted on platform 54 for rotation in a plane parallel to the fuselages 2 and 4.

Free flooding electro-mechanical actuators, controlled from remote control stations are located within the fuselage and are utilized for all principal control motions including varying the pitch of the screw 38, altering the angle of thrust of the propulsion unit 35, controlling the position of the rudders 22 and 24, azimuth and elevation of television camera 42, controlling the motions of the manipulating arm 44, 46 and claw 48 and raising and lowering boom 52.

Pitch, rudder, television camera and floodlight controls are preferably position-demand servo systems.

The thrust angle of the propulsion unit 35 is preferably controlled by a depth-keeping servo system with a depth transducer as the sensing element, and a rate transducer to limit maximum and minimum vertical rates of speed.

These free flooding mechanical actuators are of well known construction. Other actuators such as those of the hydraulic or pneumatic type can be used where suitable.

From the foregoing description it will be apparent that I have provided an underwater craft which may be freely and accurately directed underwater for observation purposes and to perform light work during salvage operations and underwater explorations.

By connecting the control cables to the underwater craft in such a manner that they act on the craft at the center of resistance, by providing coincidence within a single plane of the centers of drag, cable tension, buoyancy and component force of thrust opposing drag and cable tension, and by establishing forces of buoyancy-gravity coupled about this plane, a stability is achieved which successfully overcomes any tendency of forces due to cable tension to interfere with the accurate maneuverability of the underwater vehicle, and permits establishing and maintaining a given heading and course of the underwater craft as well as a constant depth while being propelled through the water.

Furthermore, although the force of thrust acting on the herein disclosed inventive underwater craft is provided by a propulsion unit, my inventive improvements can with equally beneficial results be applied to an underwater craft that receives its forward thrust by towing means rather than by propelling means.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. An underwater craft comprising a pair of elongated, cigar-shaped fuselages, pressure vessels held captive within said fuselages to impart a given buoyancy to said craft, propulsion means pivotally mounted between said fuselages for rotation about an axis lateral to the axis of said fuselages to exert a thrust to said craft, an arched yoke spanning both of said fuselages and pivotally mounted on the sides thereof for rotation about an axis lateral to the axis of said fuselages, said axis of rotation passing through the center of resistance of said underwater craft, a carriage freely mounted on said arched yoke for movement along said yoke, and a control cable extending through said carriage and deriving support therefrom at a point which is spaced from the terminal end of said cable that is connected to one of said fuselages, whereby to cause any tension applied thereto, as the underwater craft moves through the water, to be exerted through the center of resistance of the underwater craft.

2. An underwater craft as defined in claim 1 wherein said axis of rotation of said propulsion means and said axis of rotation of said arched yoke, both pass through the center of resistance of said underwater craft.

3. An underwater craft comprising a pair of spaced, elongated, cigar-shaped fuselages, planing surfaces joining said fuselages, stabilizing fins and rudder means connected to the rear portion of said fuselages, propulsion means pivotally mounted between said fuselages for rotation about an axis normal to the longitudinal axis of said fuselages, an arched yoke spanning said fuselages and pivotally supported on the sides thereof for rotation about an axis which is parallel to the axis of rotation of said propulsion means, and a cable carriage slidingly mounted on said arched yoke for movement along said arch from one side of said fuselages to the other.

4. An underwater craft as defined in claim 3 wherein said arched yoke is pivotally supported about an axis of rotation that is co-axial with the axis of rotation of said propulsion means.

5. An underwater craft comprising a pair of spaced, elongated, cigar-shaped fuselages, gripping means mounted at the front end of said one of said fuselages, a viewing camera mounted in the front end of the other fuselage, floodlights suspended from said fuselages, planing surfaces joining said fuselages, stabilizing fins and rudder means connected to the rear portion of said fuselages, propulsion means pivotally mounted between said fuselages for rotation about an axis normal to the longitudinal axis of said fuselages, an arched yoke spanning said fuselages and pivotally supported on the sides thereof for rotation about an axis parallel to the axis of rotation of said propulsion means, and a cable carriage slidingly mounted on said arched yoke for movement along said arch from one side of said fuselages to the other.

6. An underwater craft comprising a pair of spaced, elongated, cirgar-shaped fuselages, gripping means mounted at the front end of said one of said fuselages, television camera mounted in the front end of the other fuselage, floodlights suspended from said fuselages, planing surfaces joining said fuselages, stabilizing fins and rudder means connected to the rear portion of said fuselages, propulsion means pivotally mounted between said fuselages for rotation about an axis normal to the longitudinal axis of said fuselages, an arched yoke spanning said fuselages and pivotally supported on the sides thereof for rotation about an axis parallel to the axis of rotation of said propulsion means, and a cable carriage slidingly mounted on said arched yoke for movement along said arch from one side of said fuselages to the other.

7. An underwater craft comprising a pair of spaced, elongated, cigar-shaped fuselages, gripping claw mounted at the front end of said one of said fuselages, television camera mounted in the front end of the other fuselage, floodlights suspended from said fuselages, planing surfaces joining said fuselages, stabilizing fins and rudder means connected to the rear portion of said fuselages, propulsion means pivotally mounted between said fuselages for rotation about an axis normal to the longitudinal axis of said fuselages, an arched yoke spanning said fuselages and pivotally supported on the sides thereof for rotation about an axis parallel to the axis of rotation of said propulsion means, and a cable carriage slidingly mounted on said arched yoke for movement along said arch from one side of said fuselages to the other.

References Cited in the file of this patent

UNITED STATES PATENTS

| | | |
|---|---|---|
| 228,556 | Pike | June 8, 1880 |
| 638,335 | Holland | Dec. 5, 1899 |
| 872,888 | Becchi et al. | Dec. 3, 1907 |
| 1,329,225 | Burke | Jan. 27, 1920 |
| 2,023,334 | Marmonier | Dec. 3, 1935 |
| 2,359,964 | Barnett | Oct. 10, 1944 |
| 2,377,442 | Osterhoudt | June 5, 1945 |

FOREIGN PATENTS

| | | |
|---|---|---|
| 446,807 | Italy | Mar. 28, 1949 |